(12) United States Patent
Lee et al.

(10) Patent No.: US 7,268,767 B2
(45) Date of Patent: Sep. 11, 2007

(54) THIN FILM TRANSISTOR LIQUID CRYSTAL DISPLAY

(75) Inventors: Won-Kyu Lee, Sungnam-shi (KR); Hyong-Gon Lee, Yongin-shi (KR)

(73) Assignee: Samsung Electronics Co., Ltd. (KR)

( * ) Notice: Subject to any disclaimer, the term of this patent is extended or adjusted under 35 U.S.C. 154(b) by 121 days.

(21) Appl. No.: 10/051,226

(22) Filed: Jan. 22, 2002

(65) Prior Publication Data
US 2002/0097351 A1  Jul. 25, 2002

(30) Foreign Application Priority Data
Jan. 20, 2001  (KR) ................... 2001-3442

(51) Int. Cl.
*G09G 3/36* (2006.01)

(52) U.S. Cl. ............ 345/103; 345/92; 349/139

(58) Field of Classification Search ........... 349/38, 349/39, 42, 43, 139, 192, 54, 149, 152; 345/87, 345/92, 93, 103
See application file for complete search history.

(56) References Cited

U.S. PATENT DOCUMENTS

| | | | | |
|---|---|---|---|---|
| 4,714,921 A | * | 12/1987 | Kanno et al. | 345/100 |
| 5,641,974 A | * | 6/1997 | den Boer et al. | 257/59 |
| 5,771,031 A | * | 6/1998 | Kinoshita et al. | 345/98 |
| 6,313,889 B1 | * | 11/2001 | Song et al. | 349/54 |
| 6,580,486 B1 | * | 6/2003 | Sekine | 349/139 |
| 6,633,359 B1 | * | 10/2003 | Zhang et al. | 349/141 |
| 6,700,562 B1 | * | 3/2004 | Knapp et al. | 345/98 |
| 2001/0015711 A1 | * | 8/2001 | Aoki | 345/92 |

* cited by examiner

*Primary Examiner*—Amr A. Awad
*Assistant Examiner*—Tom V Sheng
(74) *Attorney, Agent, or Firm*—F. Chau & Associates, LLC

(57) ABSTRACT

A thin film transistor liquid crystal display (TFT-LCD) of a line inversion type for block-driving data lines is provided which can prevent a block defect. In accordance with the feature of the present invention, the TFT-LCD includes an extension part such as an extension piece overlapping with a pixel electrode of boundary pixels at a boundary data line applying a data signal to the boundary pixels.

16 Claims, 8 Drawing Sheets

THIN FILM TRANSISTOR LIQUID CRYSTAL DISPLAY

FIELD OF THE INVENTION

The present invention generally relates to a thin film transistor liquid crystal display and, more particularly, to a thin film transistor liquid crystal display which performs block driving of a data line.

BACKGROUND OF THE INVENTION

There are various approaches for driving a liquid crystal display (LCD), which are invented in view of display characteristics, an interconnection construction for a panel, liquid crystal characteristics, a construction of thin film transistors constituting pixels, and the like. Various driving approaches for a specific purpose are used together to drive the whole LCD. As an approach for driving a data line, a block driving approach is used in which a constant number of data lines constitute one block and data lines in the same block concurrently receive their own signals to represent a picture. Particularly, a polysilicon-type thin film transistor liquid crystal display (TFT-LCD) usually employs the block driving approach because of panel characteristics.

On the other hand, a column inversion approach and a line inversion approach are used as a data line driving approach. If the column inversion approach is used in small and medium-sized liquid crystal displays which usually employ the polysilicon-type TFT-LCD, a power consumption is great. Therefore, the column inversion approach is not suitable for small and medium-sized mobile devices. In addition, the column inversion approach causes a cross-talk phenomenon that results in deterioration of an LCD resolution along a signal line.

In this regard, a polysilicon-type TFT-LCD suitable for mobile devices preferably employs a block driving and line inversion approach. Nonetheless, the block driving LCD employing the line inversion approach suffers from a block defect, the phenomenon that a sensible line is formed on a boundary between blocks each constituting a picture. The block defect will now be described hereinbelow with reference to accompanying drawings.

FIG. 1 illustrates a pixel construction layout of a conventional TFT-LCD. In order to achieve such a construction, an active pattern 11 is first formed on a substrate. After stacking a gate insulating layer, a gate line 12 and a storage line 15 are formed by stacking and patterning. A data interconnection 21 and source/drain electrodes 23 and 25 are formed on an interlayer insulating layer having source drain contact holes 17 and 19. A pixel electrode 29 is formed on an insulating layer having a pixel electrode contact hole 27.

If a pixel electrode is made of a reflective plate such as aluminum and a data line is located in a space between pixel electrodes, a black matrix layer is conventionally formed on an upper plate to overlap with a data line in order for increasing the picture contrast.

FIG. 2 is a cross-sectional view taken along a line I—I of FIG. 1. Pixel electrodes 29 are formed in a lower plate 10. Data lines 21 are formed under the pixel electrodes 29, respectively. Each of the data lines 21 partially overlaps both sides of each of the pixel electrode 29. An insulating layer is formed between the data line 21 and the pixel electrode 29, so that one of the pixel electrode 29 and drain electrodes 21 are electrically interconnected through a virtual capacitor, as shown in a dotted ellipse of FIG. 2. At this time, a virtual or parasitic capacitance is produced which is identical to a capacitance of left and right virtual capacitors in the pixel electrode 29 due to a symmetric shape of a pixel construction.

A black matrix 35 is formed in an upper plate 40 to overlap a data line, and a color filter 33 is formed to overlap the pixel electrode 29. A liquid crystal layer 31 is formed between the upper plate 40 and the lower plate 10. A common electrode (not shown) is conventionally formed on a surface of the upper plate 40 to contact the liquid crystal layer 31.

FIG. 3 is an equivalent circuit diagram showing a pixel construction on a block boundary so as to depict a block defect. Pixels contacting the boundary are (N−1)th, Nth, (N+1)th, and (N+2)th pixels which are formed along a gate line. If N-numbered pixels or data lines constitute one block for block driving, the Nth pixel belongs to a first block and the (N+1)th pixel belongs to a second block. Assuming that a data line applying a data signal to a pixel is formed on the right of a pixel electrode, there is a is difference between impressed voltages when the data signal is applied to the first block. When a data signal is applied to the first block, signal apply of the left and right data lines has an effect on the Nth pixel (this effect, i.e., impressed voltage is referred to as "$V_N$"). When a data signal is applied to the second block, signal supply of the left and right data lines has an effect on the (N+1)th pixel (this effect, i.e., impressed voltage is referred to as "$V_{N+1}$"). Namely, it is shown that there is a difference between the "$V_N$" and "$V_{N+1}$".

Equations for calculating effects on a pixel electrode are given as follows:

$$Q = CV \quad \text{[Equation 1]}$$

$$CP = f(C_{LD}, C_{RD}, C_{STG}, C_{LC}, C_G, C_{DG}, C_{DS}) \quad \text{[Equation 2]}$$

$$Cp\Delta Vp = C_{LD}V_{LD} + C_{RD}\Delta V_{RD} \quad \text{[Equation 3]}$$

In the "Equation 1", the "Q", "C", and "V" represent a quantity of electricity, a capacitance, and a voltage, respectively. The "Equation 1" means that a quantity of electricity is maintained in a floated electrode. Under the assumption of good insulation and short time, the pixel electrode is like a floated conductor. The total capacitance of pixel electrodes is determined by a capacitance that is produced by the pixel electrode together with elements in the other pixels (see "Equation 2"). Therefore, when a voltage varies in a part of these elements, a voltage in the pixel electrode also varies (see "Equation 3").

Additionally speaking, a pixel is affected at left and right data lines. This means that a pixel electrode to affect a liquid crystal has a voltage varied by signal apply of the left and right data lines. Therefore, voltage variation of a pixel means voltage variation Vp of a pixel electrode. A capacitance Cp of a pixel electrode in each pixel is a contribution function of a capacitance between associated elements, and is denoted as the "Equation 2" wherein the Cp, $C_{LD}$, $C_{RD}$, $C_{STG}$, $C_{LC}$, $C_G$, $C_{DG}$, and $C_{DS}$ represent the total capacitance of a pixel electrode, a capacitance created by a data line in the right of the pixel electrode, a capacitance created by a liquid crystal layer, a capacitance created by a gate electrode, a capacitance between a data electrode and a gate electrode, and a capacitance between a data electrode and a storage electrode, respectively. Since materials and shapes are predetermined, the capacitance Cp is substantially constant and does not vary in each pixel.

The "Equation 3" denotes that when only a signal of a data line varies without variation of other elements, a capacitance multiplied by a variation degree of a pixel electrode is the sum of capacitances each being multiplied by signals of left data signal and right data signal, i.e., voltage variation degrees.

The following two equations show that a voltage variation degree based on a parasitic capacitance for left data line and right data line of an Nth pixel electrode when a data signal is applied to a first block, and a voltage variation degree based on a parasitic capacitance for left and right data lines of an (N+1)th pixel electrode when a data signal is applied to a second block, respectively.

$$\Delta Vp(N) = \{C_{LD}\Delta V_D(N-1) + C_{RD}\Delta V_D(N)\}/Cp(N) \qquad \text{[Equation 4]}$$

$$\Delta Vp(N+1) = \{C_{LD}\Delta V_D(N) + C_{RD}\Delta V_D(N+1)\}/Cp(N+1) \qquad \text{[Equation 5]}$$

In the "Equation 4" and "Equation 5", when driving the first block, $\Delta V_D(N-1)$ and $\Delta V_D(N)$ are identical to each other. When driving the second block, $\Delta V_D(N)$ goes to "0" and $\Delta V_D(N+1)$ is identical to $\Delta V_D(N)$ when driving the first block. $C_{LD}$ and $C_{RD}$ may have the same value for a pixel in view of uniformity and symmetry of a pixel construction, as shown in FIG. 2. As a result, the following equation is acquired.

$$\Delta V_D(N) = 2\Delta V_D(N+1) \qquad \text{[Equation 6]}$$

The "Equation 6" shows that a voltage of a pixel electrode in a pixel connected to a first data line is different from voltages of the other electrodes. A difference between the voltages applied to the pixel electrodes means a beam penetration difference of the pixel resulting from a liquid crystal arrangement. This difference causes a block defect.

Therefore, one feature of the present invention is to provide a liquid crystal display which suppresses a block defect in line-inversion block driving.

Another feature of the present invention is to provide a liquid crystal display which prevents a boundary creation on a picture in the line-inversion block driving.

SUMMARY OF THE INVENTION

According to an aspect of the present invention, a thin film transistor liquid crystal display (TFT-LCD) of a line inversion type for block-driving data lines includes an extension part such as an extension piece overlapping a pixel electrode of boundary pixels at a boundary data line applying a data signal to the boundary pixels. The extension part serves to equivalently apply a voltage, which varies by a parasitic capacitor influence, to pixels at a boundary of the data line blocks.

There is no specific confinement about position and shape of the extension part. But an overlapping area of the extension part with a pixel electrode in a pixel where a data line applies a signal preferably approaches to an overlapping area of the pixel electrode with one of the right and left data lines in non-outermost pixels. In other words, a parasitic capacitance made by the extension part is preferably identical to a parasitic or virtual capacitance between one data line and the pixel electrode. The extension part may be formed by extending a width of the boundary data line toward the pixel electrode of the boundary pixels.

If the number of data lines a block is "N" and a natural number obtained by subtracting 1 from the number of blocks constituting a picture of the TFT-LCD is "I", the boundary pixels are pixels between an INth data line and an (IN+1)th data line. Therefore, if the data line applying a data signal to a pixel is located in the left of the pixel, INth pixels are located in the right of the pixel along each gate lines, and (IN+1)th pixels may become pixels on the block boundary.

However, a 0th data line may be formed in the left of the first pixel electrode when a data line of a corresponding pixel is located in the right of the pixel in order to pass the data line in the left and right of all pixels. Alternatively, if a (M+1)th data line may be located in the right of the last Mth pixel, a position of the pixel on the block boundary may vary in view of an added data line.

According to another aspect of the present invention, a thin film transistor liquid crystal display (TFT-LCD) of a line inversion type for block-driving data lines includes a substrate, thin film transistors formed in each pixel to form a matrix, a plurality of gate lines, a plurality of data lines, and a plurality of pixel electrodes. In the thin film transistors, a gate electrode crosses a polysilicon-type active pattern which is formed in the substrate and is apart from the pattern by a gate insulating layer. The gate lines are connected to gate electrodes of thin film transistors of the same row in the matrix. The data lines are electrically connected to drain regions of thin film transistors of the same column in the matrix so as to apply a data signal to the thin film transistors, and are parallel with one another to pass peripheral parts of the pixels. The pixel electrodes are formed in the middle of the pixels so as to be connected to a source region of the thin film transistors, and have areas overlapping adjacent data lines. The TFT-LCD further includes an extension part overlapping a pixel electrode of boundary pixels at a boundary data line applying a data signal to the boundary pixels.

In the above construction, if the number of data lines a block is "N" and a natural number obtained by subtracting 1 from the number of blocks constituting a picture of the TFT-LCD is "I", the boundary pixels are pixels between an INth data line and an (IN+1)th data line.

The pixel electrode may be either a metallic reflective plate or a transparent electrode. The TFT-LCD further includes a storage line for connecting a storage electrode, which makes a capacitance together with the pixel electrode, to a row of the matrix. Alternatively, the pixel electrode may be apart from the data line by an organic insulating layer, and an embossing may be formed on a surface of the organic insulating layer so as to form a micro lens.

DESCRIPTION OF THE PREFERRED EMBODIMENT

Figure 4:
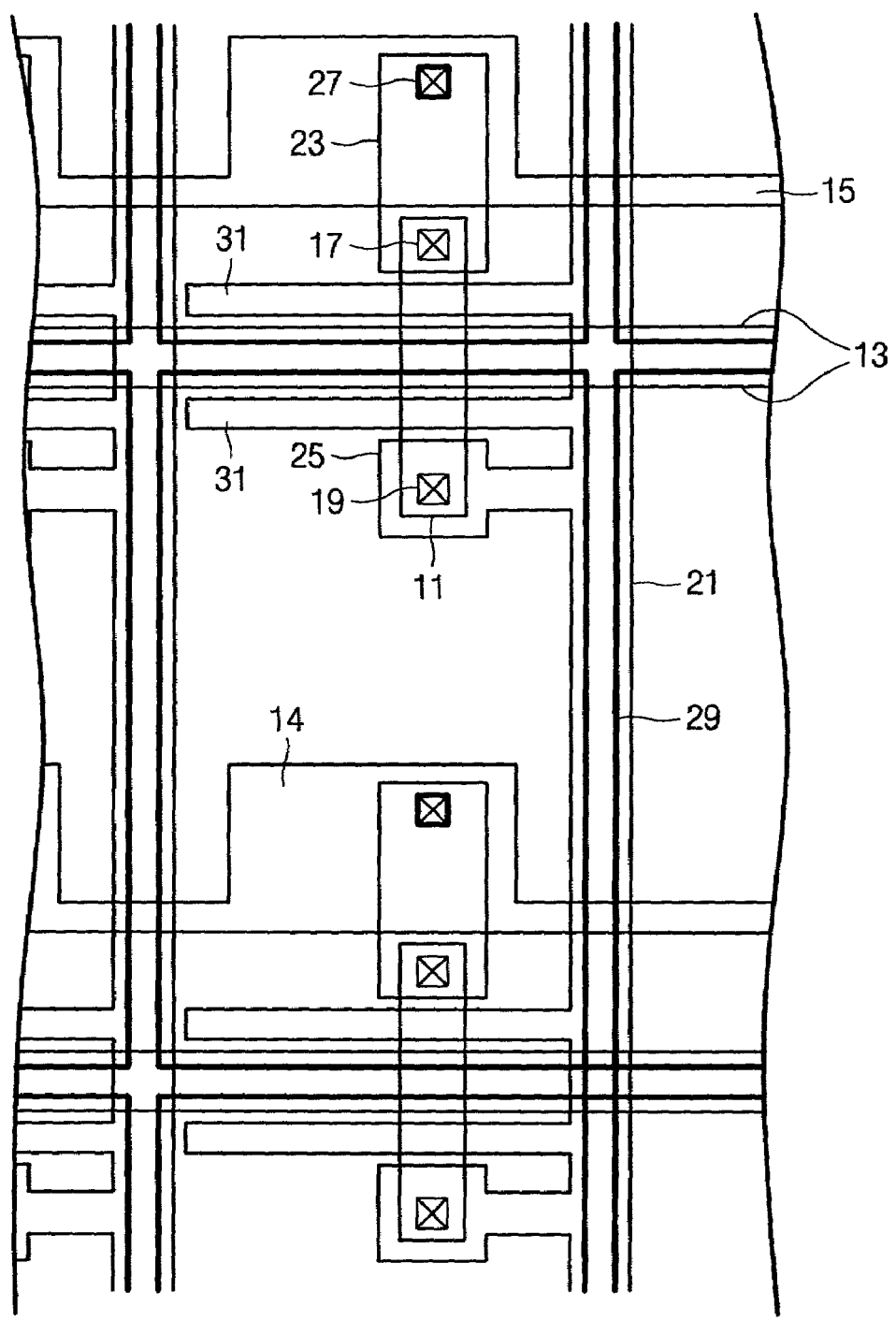
FIG. 4 is a top plan view showing a block boundary unit pixel layout in a thin film transistor liquid crystal display according to an embodiment of the present invention.

FIG. 4 illustrates a block boundary unit pixel layout of a thin film transistor liquid crystal display according to an embodiment of the present invention, on the premise that a data line is subject to line-inversion block driving.

Referring now to FIG. 4, a pixel has a polysilicon active region pattern 11. An amorphous silicon layer is formed on a substrate to a thickness of thousand of angstroms, and then is turned into a polysilicon layer through a laser annealing process. Alternatively, the laser annealing process can be shipped when the amorphous silocon layer is used for the active region. The polysilicon layer is patterned through photolithographic and etching processes to form the polysilicon active region pattern 11. The active region pattern 11 is divided into two gate lines 13 each including a gate electrode. The gate line 13 is separated from the active region pattern 11 by a gate insulating layer of a pre-formed silicon nitride or oxide layer (not shown). A storage line 15 is formed in parallel with the gate line 13. Conventionally, the storage line 15 is the same conductive layer as the gate line 15 and is formed at the same time to pattern the gate line 13. Since the storage line 15 is to compensate a capacitance of a capacitor comprising a pixel electrode 29, a width of the storage line 15 is large in order to increase a capacitance at a pixel area in which the pixel electrode 29 is formed. An upper source area of the active region pattern 11 divided into the gate lines 13 is connected to a source electrode 23 through a source electrode contact 17 formed at an insulating layer (not shown). A lower drain region of the active region pattern 11 is connected to a drain electrode 25 through a drain electrode contact 19 formed at an insulating layer (not shown). The drain electrode 25 is connected to a data line 21 through a protruding part at the data line 25. The source and drain electrodes 23 and 25 and the data line 21 are formed by patterning the same conductive layer. The source electrode 23 is connected to the pixel electrode 29, which covers most part of the pixel electrode, through a pixel electrode contact 27 formed at a conductive layer (not shown). If the conductive layer is made of photosensitive organic insulator, it may be patterned only through an exposure process. If a protrusion is formed on a surface of a protection layer, an overlying pixel electrode produces a micro lens to heighten a resolution of a liquid crystal display (LCD). In a reflective LCD, the pixel electrode is a reflective plate that is made of metal such as aluminum. In a transmissive LCD, the pixel electrode uses a transparent electrode that is made of, for example, indium tin oxide (ITO) or indium zinc oxide (IZO). The data lines 21 are parallel with both sides of the pixel electrode 29. Each of the data lines 21 partially overlaps with the pixel electrode 29 to form a virtual capacitor. The data line 21 formed in the right of the pixel electrode 29 applies a data signal to a thin film transistor of a pixel. An extension piece 31 is formed in the left of the data line 21 to overlap with upper and lower parts of the pixel electrode 29, not a protrusion for coupling the right data line 21 to the drain electrode 25. The data line 21 and the extension piece 31 are formed at the same time.

Figure 1:
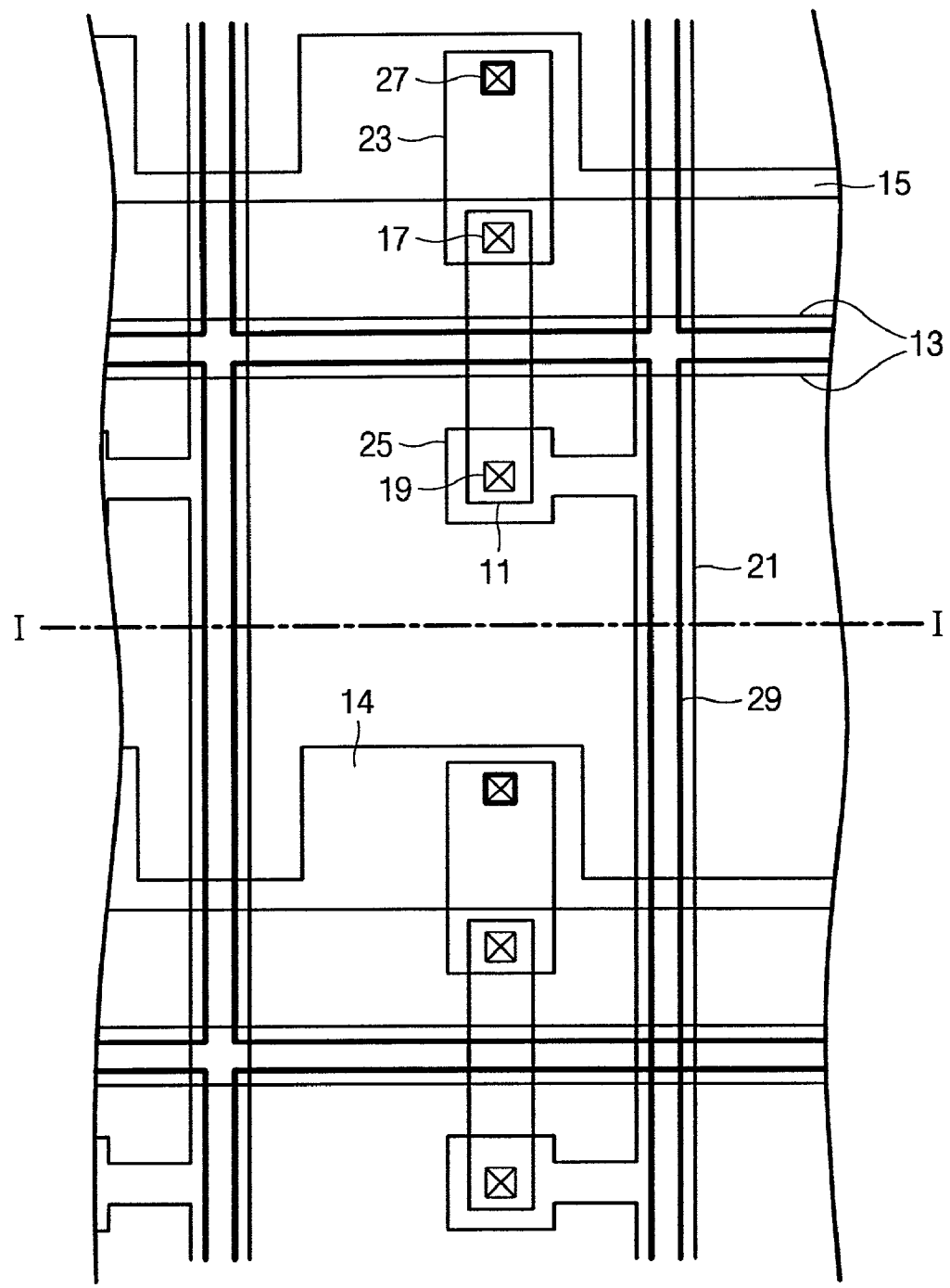
FIG. 1 is a top plan view showing a pixel construction layout of a conventional thin film transistor liquid crystal display.
Figure 2:
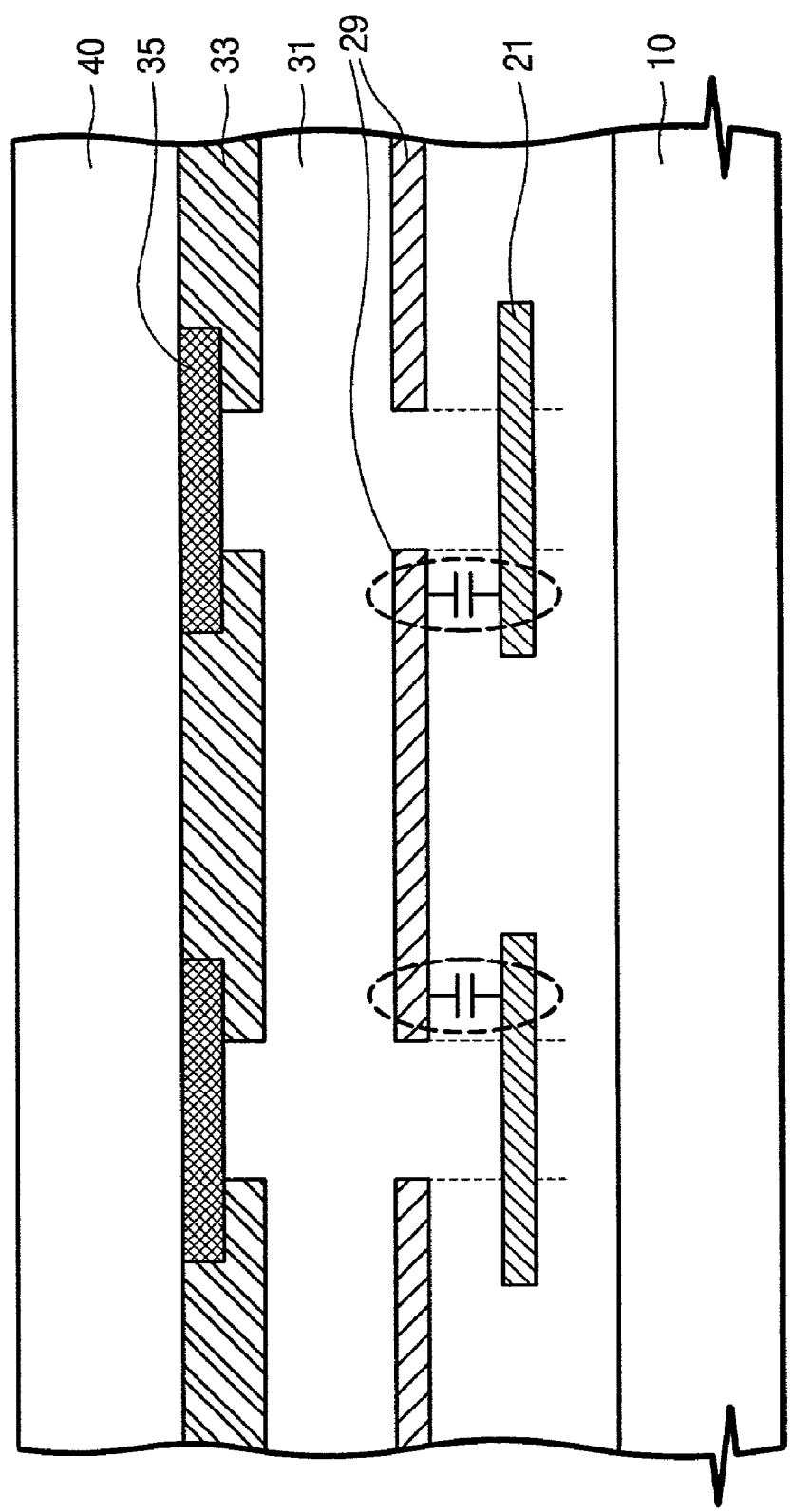
FIG. 2 is a cross-sectional view taken along a line I—I of FIG. 1.
Figure 3:
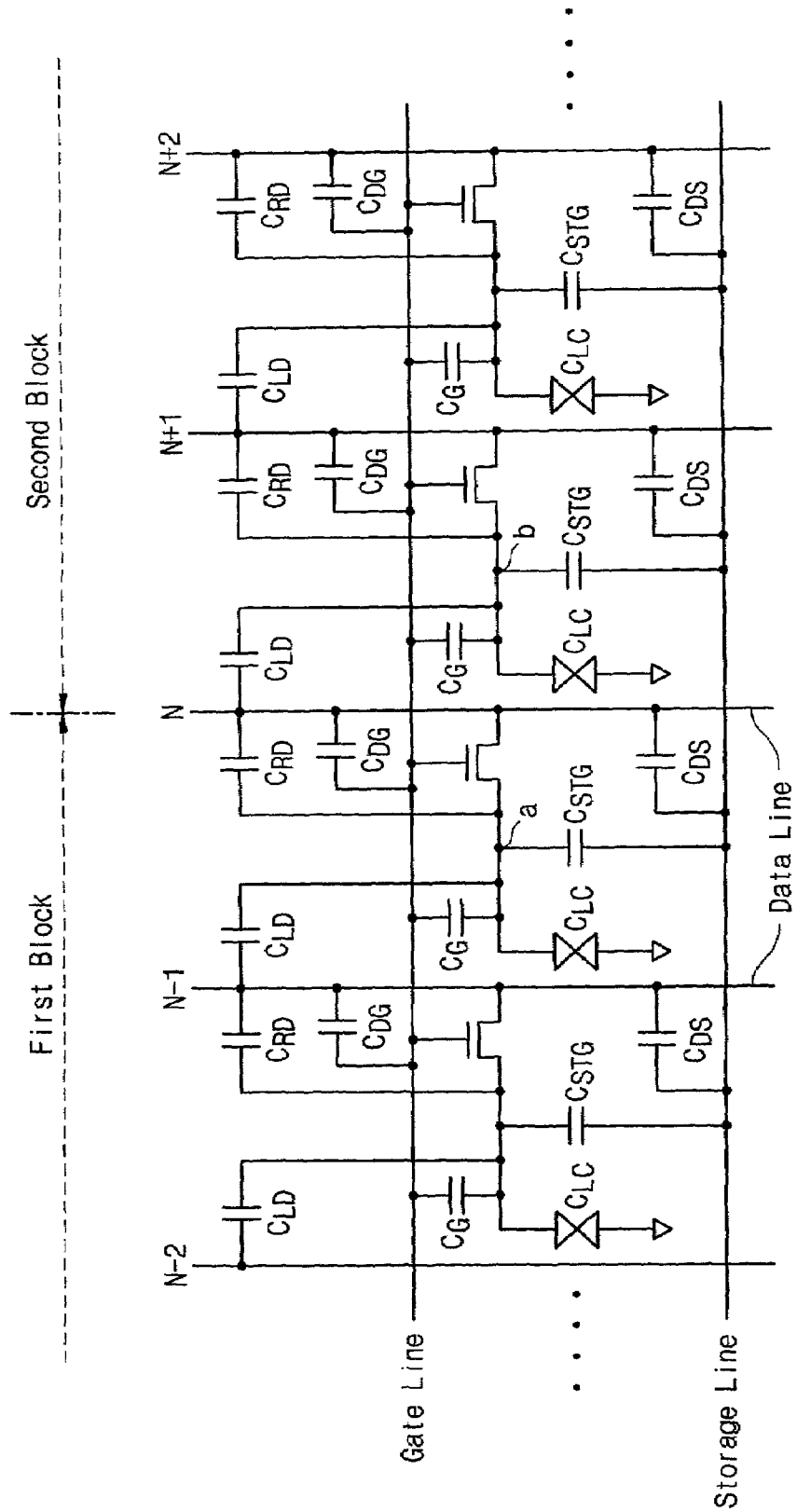
FIG. 3 is an equivalent circuit diagram showing a pixel construction on a block boundary in order to disclose a block defect.
Figure 5:
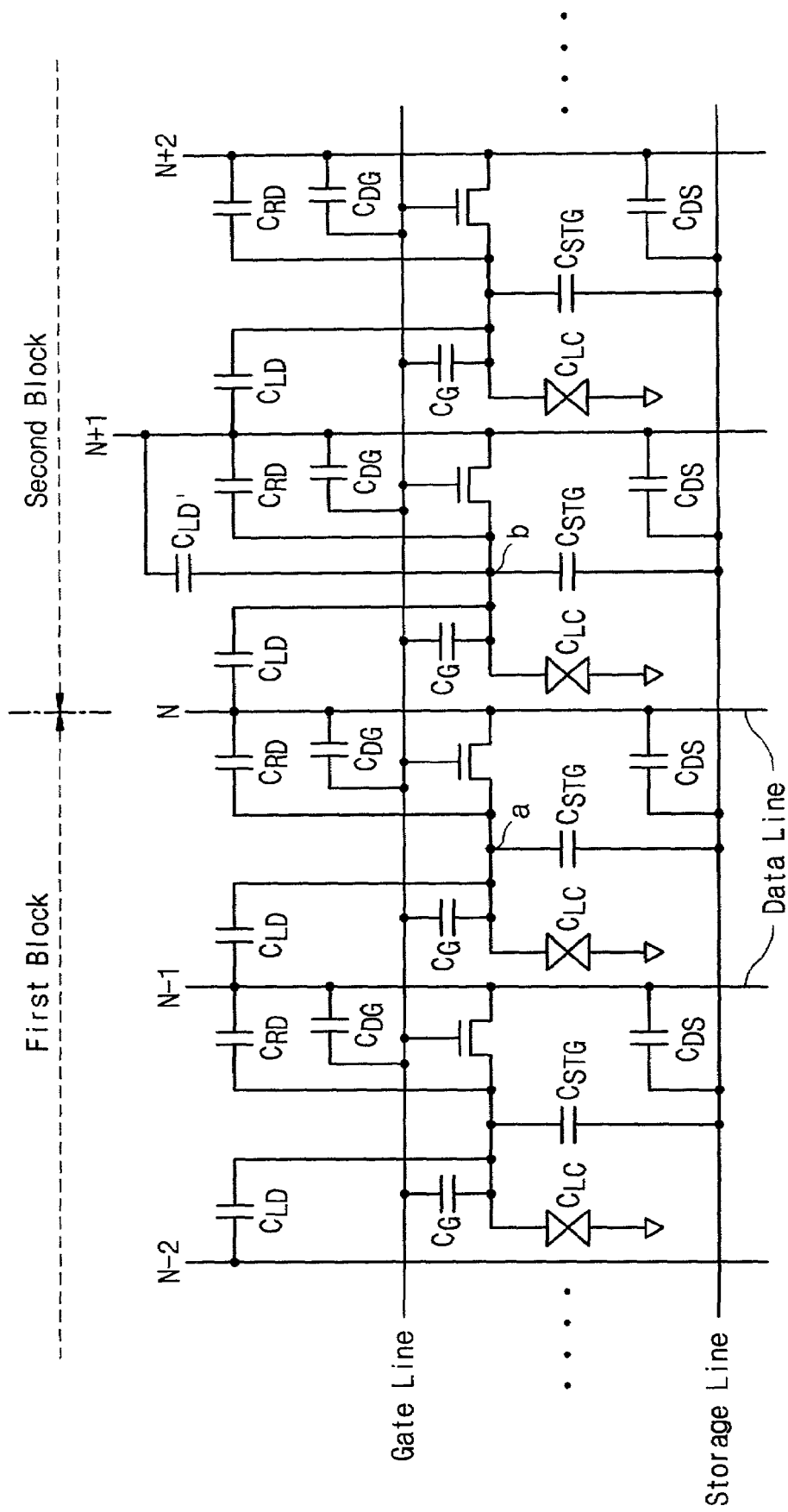
FIG. 5 is an equivalent circuit diagram additionally showing pixels and signal lines around pixels shown in FIG. 4.

There is a difference between circuit constructions shown in FIG. 5 and FIG. 3. A thin film transistor, a pixel electrode, a gate line, a storage line, and a liquid crystal have not changed, but one capacitor $C_{LD}'$ is added between an (N+1)th data line and a pixel electrode. The (N+1)th data line applies a data signal to a pixel on a block boundary, i.e., a pixel between an Nth data line and the (N+1)th data line. In this case, the capacitor $C_{LD}'$ is formed for denoting a virtual capacitance that is created at a part where an extension piece extended from a data line and a pixel electrode are laid overlapping each other. The virtual capacitance varies depending on a geometric arrangement and an area of the extension piece. However, since a dielectric constant and a separation distance between capacitor electrodes are determined by an interlayer insulating layer and its thickness, the additional capacitance is mainly determined by an overlapping area.

With an extension piece according to the present invention, when a data signal is applied to a first block, the voltage variance by a parasitic capacitance with right data line and left data line of an Nth pixel electrode is named "DV1". And when the data signal is applied to a second block, the voltage variance by a parasitic capacitance with right data line and left data line of an (N+1)th pixel electrode is named "DV2". Since the Nth pixel electrode has not changed, the voltage variances "DV1" and "DV2" are calculated to obtain the foregoing "Equation 4". On the other hand, in case of the (N+1)th pixel electrode, the "Equation 5" is converted to "Equation 7".

$$\Delta V p(N+1) = \{C_{LD}'\Delta V_D(N+1) + C_{RD}\Delta V_D(N+1)\}/C p(N+1) \quad \text{[Equation 7]}$$

Further, if the extension piece is equal to an area of the left data line shown in FIG. 4 (i.e., $C_{LD}' = C_{LD}$), $\Delta Vp(N)$ is turned into $\Delta Vp(N+1)$. Thus, a block defect does not occur.

Figure 6:
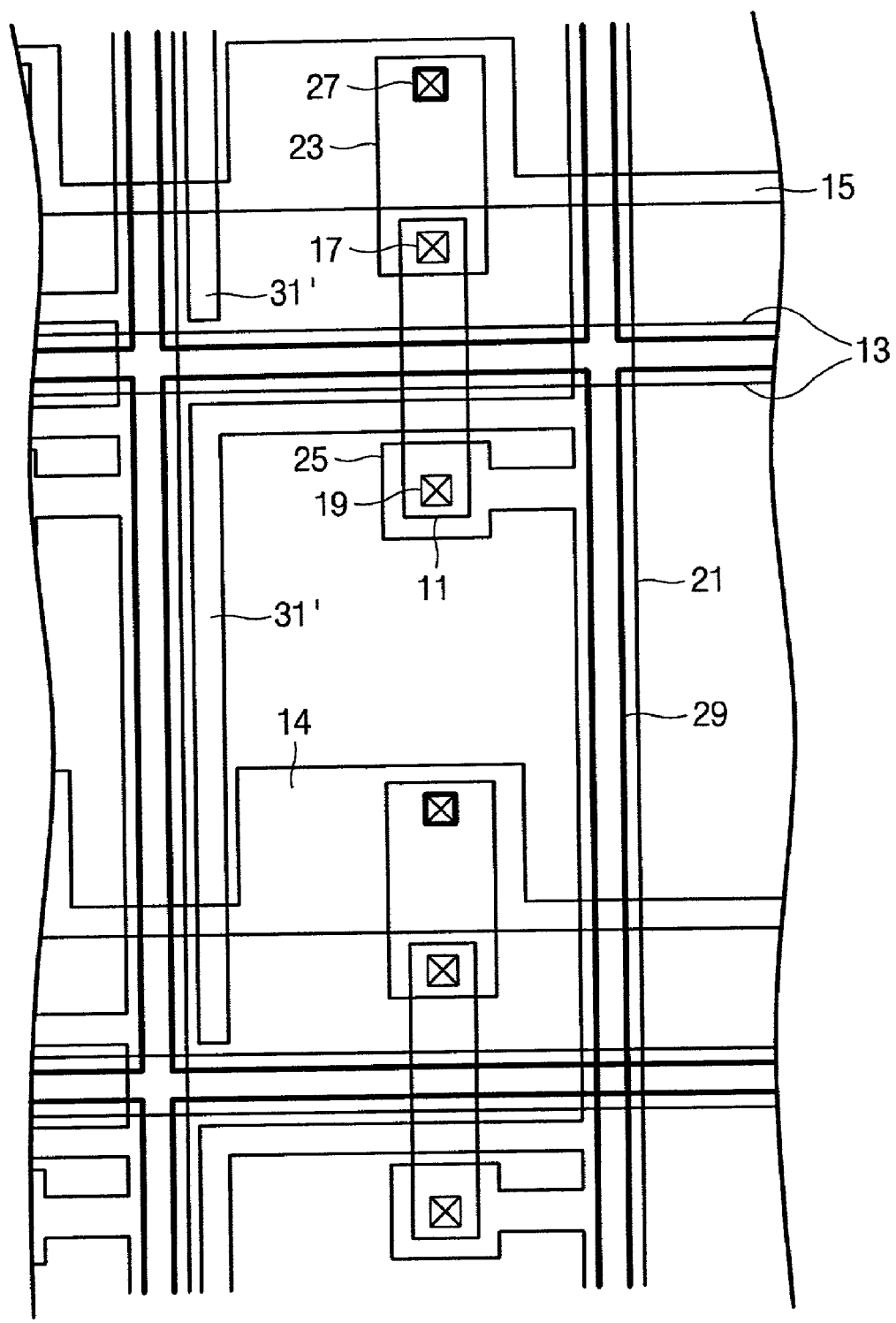
FIG. 6 through FIG. 8 are top plan views of another embodiments of the present invention.
Figure 7:
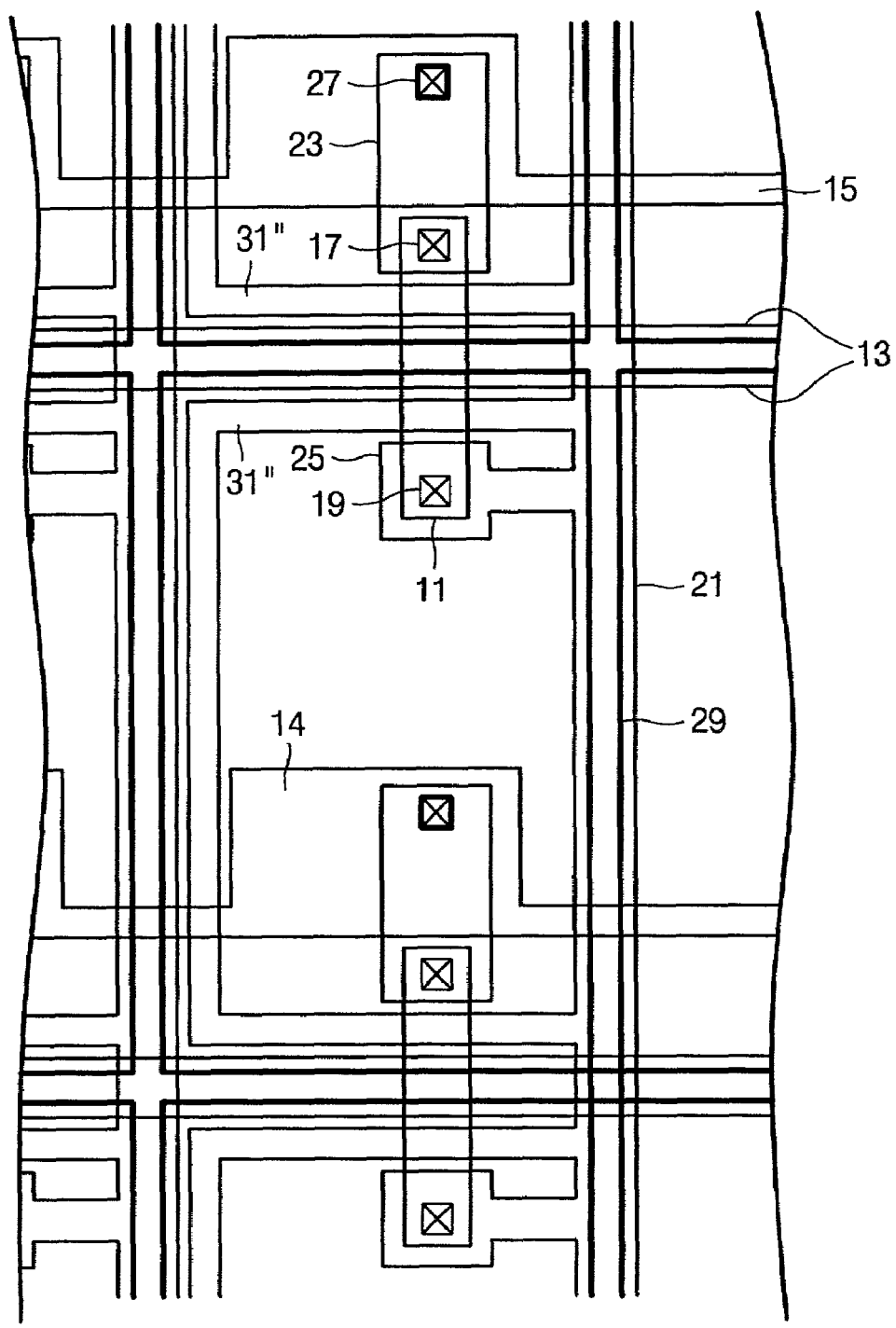

FIG. 6 and FIG. 7 illustrate another embodiments of the present invention, in which extension pieces 31' and 31" are formed toward a data line adjacent to a pixel, respectively, to make a pixel electrode capacitance similar to that in other pixels. In the above-described embodiments, because the extension piece is formed of a metal conductive layer such as a conventional data line, a transmissive LCD suffers from the lowered aperture ratio. Therefore, the invention is more effective in reflective LCDs than in transmissive LCDs.

Figure 8:
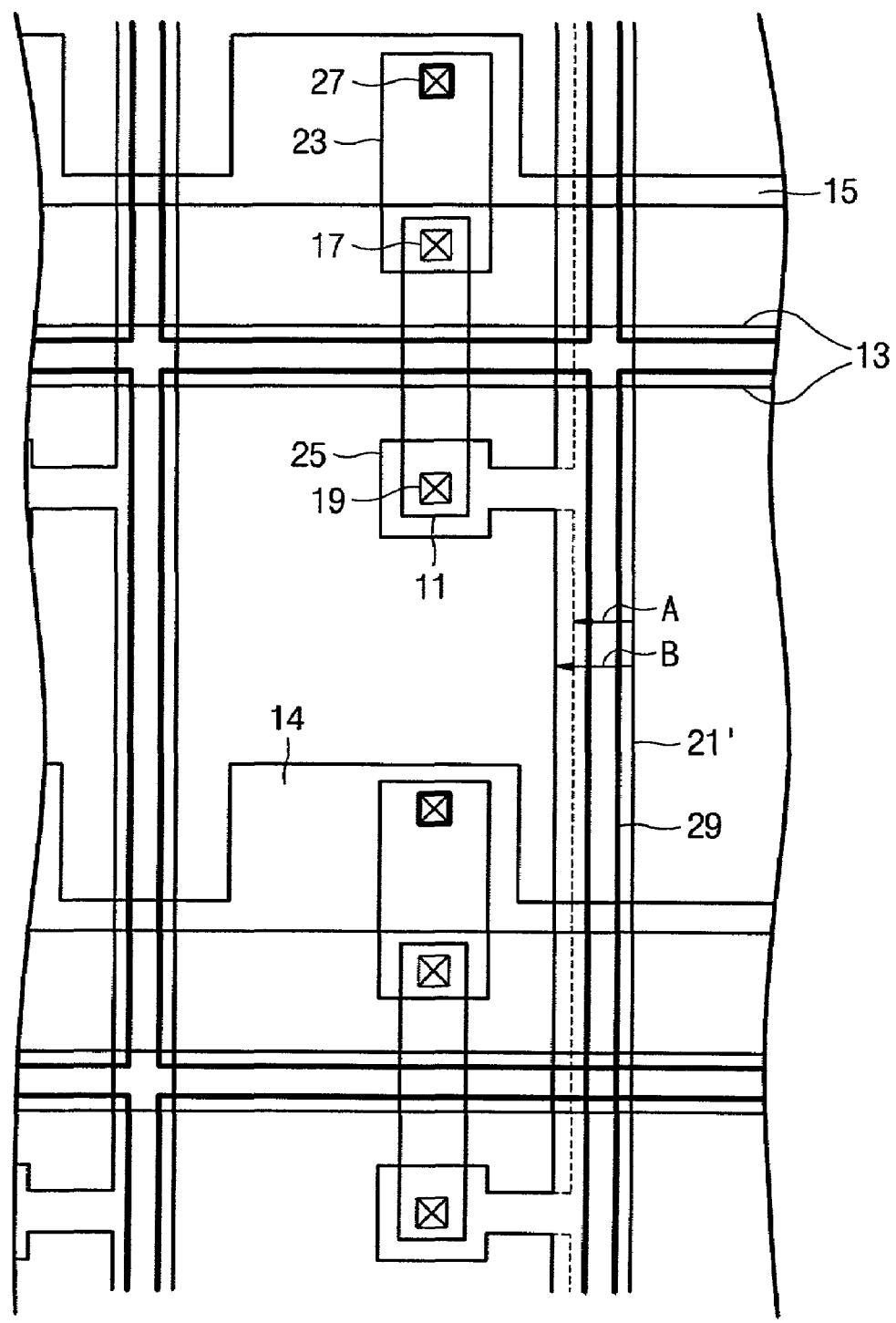

FIG. 8 shows an example that a data line 21' applying a data signal to a thin film transistor of a block boundary pixel is wider than other data lines.

According to the present invention, the block defect can be prevented. That is, dark or bright lines do not appear at a block boundary in a TFT-LCD for block-driving data lines with the use of a line version block-driving technique.

The foregoing description of preferred embodiments has been presented for purposes of illustration and description. It is not intended to be exhaustive or to limit the invention to the precise form described, and obviously many modifications and variations are possible in light of the above teaching. The embodiment was chosen in order to explain most clearly the principles of the invention and its practical application thereby to enable others in the art to utilize most effectively the invention in various embodiments and with various modifications as are suited to the particular use contemplated.

What is claimed is:

1. A thin film transistor liquid crystal display (TFT-LCD) comprising:
   a plurality of pixels arranged in a matrix and divided into a plurality of blocks for block driving, each block having a boundary pixel at a boundary of an adjacent previous block and a non-boundary pixel separated from the boundary by at least the boundary pixel;
   a plurality of pixel electrodes formed corresponding to the pixels; and
   a plurality of data lines formed corresponding to the pixel electrodes and comprising a boundary data line provided corresponding to the boundary pixel and a non-boundary data line different from the boundary data line corresponding to the non-boundary pixel;
   wherein the boundary data line has an extension part overlapping a portion of the pixel electrode corresponding to the boundary pixel, and the non-boundary data line does not include an extension part overlapping a portion of the pixel electrode corresponding to the non-boundary pixel.

2. The TFT-LCD as claimed in claim 1, comprising a plurality of boundary pixels arranged between an INth data line and an (IN+1)th data line, when N is the number of data lines in a block and I is a natural number obtained by subtracting 1 from the number of blocks constituting a picture of the TFT-LCD.

3. The TFT-LCD as claimed in claim 1, wherein the extension part is formed by extending a width of the boundary data line toward the pixel electrode corresponding to the boundary pixel.

4. The TFT-LCD as claimed in claim 1, wherein the extension part protruded from the boundary data line to the pixel electrode corresponding to the boundary pixel.

5. The TFT-LCD as claimed in claim 1, wherein an area of the extension part is substantially equal to an area of a portion of the pixel electrode of the boundary pixel overlapping the boundary data line.

6. A thin film transistor liquid crystal display (TFT-LCD) for block-driving data lines, comprising:
   a substrate;
   thin film transistors formed in each pixel to form a matrix, in which a gate electrode crosses an active pattern formed on the substrate and is apart from the active pattern by a gate insulating layer;
   a plurality of gate lines connected to gate electrodes of the thin film transistors of the same row in the matrix;
   a plurality of data lines electrically connected to drain regions of the thin film transistors of the same column in the matrix so as to apply a data signal to the thin film transistors, the data lines being substantially parallel with one another to pass peripheral parts of the pixels; and
   a plurality of pixel electrodes formed in the middle of the pixels so as to be connected to a source region of the thin film transistors, wherein the TFT-LCD further comprises at least one of the plurality of data lines having an extension part overlapping at least one of the plurality of pixel electrodes of a boundauy pixel, and wherein at least one of the plurality of data lines corresponding to a non-boundary pixel does not have an extension part overlapping the non-boundary pixel, to substantially minimize a block defect.

7. The TFT-LCD as claimed in claim 6, wherein boundary pixels are arranged at pixels between an INth data line and an (IN+1)th data line, when N is the number of data lines in a block and I is a number obtained by subtracting 1 from the number of blocks constituting a picture of the TFT-LCD.

8. The TFT-LCD as claimed in claim 6, wherein the pixel electrode is selected from the group consisting of a metallic reflective plate and a transparent electrode.

9. The TFT-LCD as claimed in claim 8, wherein the transparent electrode comprises material selected from the group consisting of indium tin oxide (ITO) and indium zinc oxide (IZO).

10. The TFT-LCD as claimed in claim 6, further comprising a storage line for connecting a storage electrode to a row of the matrix, wherein the storage electrode makes a capacitance together with the pixel electrode.

11. The TFT-LCD as claimed in claim 6, wherein the pixel electrode is separated from the data line by an organic insulating layer, and an embossing is formed on a surface of the organic insulating layer to form a micro lens.

12. A liquid crystal display (LCD), comprising:
    a plurality of pixel regions divided into a plurality of blocks for block driving, each block having a boundary pixel region adjacent to a previous block and a non-boundary pixel region spaced apart from the previous block;
    a plurality of pixel electrodes formed corresponding to the pixel regions; and
    a plurality of data lines comprising a boundary data line overlapping the pixel electrode of the boundary pixel region and a non-boundary data line different from the boundary data line provided corresponding to but not overlapping the pixel electrode of the non-boundary pixel region.

13. The LCD of claim 12, wherein the pixel electrodes are formed of a transparent conductive material.

14. The LCD of claim 12, wherein the pixel electrodes are formed of a reflective conductive material.

15. The LCD of claim 12, wherein the boundary data line comprises a first extension part arranged substantially across the boundary pixel electrode and a second extension part that extends from an end of the first extension part.

16. The LCD of claim 12, wherein an area of overlap between the pixel electrode of the boundary pixel region and the boundary data line is larger than an area of overlap between the pixel electrode of a non-boundary pixel region and the non-boundary data line.

* * * * *